Figure 1:
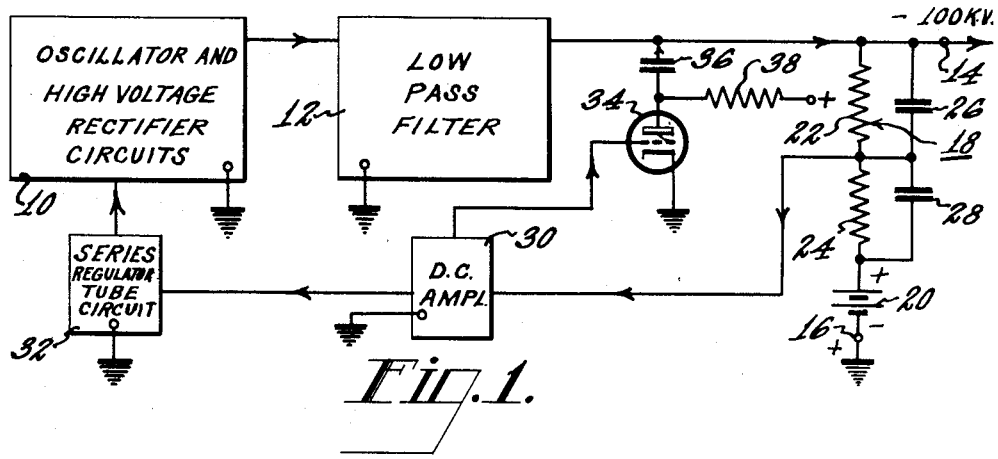

Sept. 8, 1959 L. L. EVANS ET AL 2,903,638

POWER SUPPLY

Filed Oct. 31, 1955

INVENTORS
LOUIS L. EVANS &
BY DONALD F. SPRENGELER
BY *Morrish Rabin*
ATTORNEY

United States Patent Office 2,903,638
Patented Sept. 8, 1959

2,903,638
POWER SUPPLY

Louis L. Evans, Audubon, and Donald F. Sprengeler, Pennsauken, N.J., assignors to Radio Corporation of America, a corporation of Delaware Application October 31, 1955, Serial No. 543,971

7 Claims. (Cl. 321—18)

This invention relates to power supplies, and more particularly to radio frequency (R.F.) power supplies, or pulsed power supplies, of the type adapted to provide a regulated unidirectional output voltage of relatively high amplitude in the order of 100 kilovolts. The power supply of the present invention is particularly useful for providing the regulated unidirectional high voltage needed in electron microscopes.

Power supplies employed in the usual electron microscopes must provide a unidirectional output voltage in the neighborhood of 100 kilovolts with as little ripple voltage as possible. Where an R.F. power supply is used, regulation of the output voltage is usually obtained by feeding back, degeneratively, a sample of the output voltage to one of the electrodes of the power supply R.F. oscillator. The amount of regulation obtained in this manner is limited because unwanted spurious oscillations will occur if the gain of the regulating feedback loop is increased beyond a predetermined value. The use of a shunt regulator tube, also, is not feasible in power supplies adapted to provide output voltages in the order of kilovolts because there are no commercially available electron discharge devices that can withstand the high output voltages of such power supplies.

Accordingly, it is an object of the present invention to provide an improved regulated power supply that will overcome the aforementioned disadvantages.

Another object of the present invention is to provide an improved R.F. regulated power supply adapted to provide a relatively high unidirectional output voltage with a minimum of low frequency ripple.

A further object of the present invention is to provide an improved R.F. power supply adapted to provide a highly regulated unidirectional output voltage without increasing the gain of the regulating feedback loop, thereby reducing the possibility of spurious oscillations in the feedback loop.

A still further object of the present invention is to provide an improved R.F. regulated power supply adapted to provide a unidirectional, substantially ripple free, output voltage suitable for use in an electron microscope.

In accordance with the present invention, the foregoing objects and related advantages are attained in an improved R.F., or pulsed, power supply employing an oscillator circuit inductively coupled to a voltage doubling rectifier circuit for providing a unidirectional output voltage. A sample of the output voltage is amplified and applied degeneratively to one of the electrodes of the oscillator tube in the oscillator circuit to regulate its output. Thus, most of the direct current (D.-C.) variations in the output voltage due to fluctuations in the input line voltage and/or the load are regulated. An additional reduction in the output low frequency ripple is attained, in accordance with the present invention, by an amplifier circuit comprising a triode tube having its cathode connected to the low voltage output terminal of the power supply and its anode connected to the high voltage output terminal through a capacitor. A portion of the sampled fedback output voltage is applied degeneratively to the grid of the triode tube where it is amplified. The output of the triode tube is applied to the high voltage output terminal in phase opposition to the ripple voltage appearing there. It has been found that the low frequency ripple output of a power supply of the type described may be reduced significantly by the last mentioned circuit.

Figure 2:
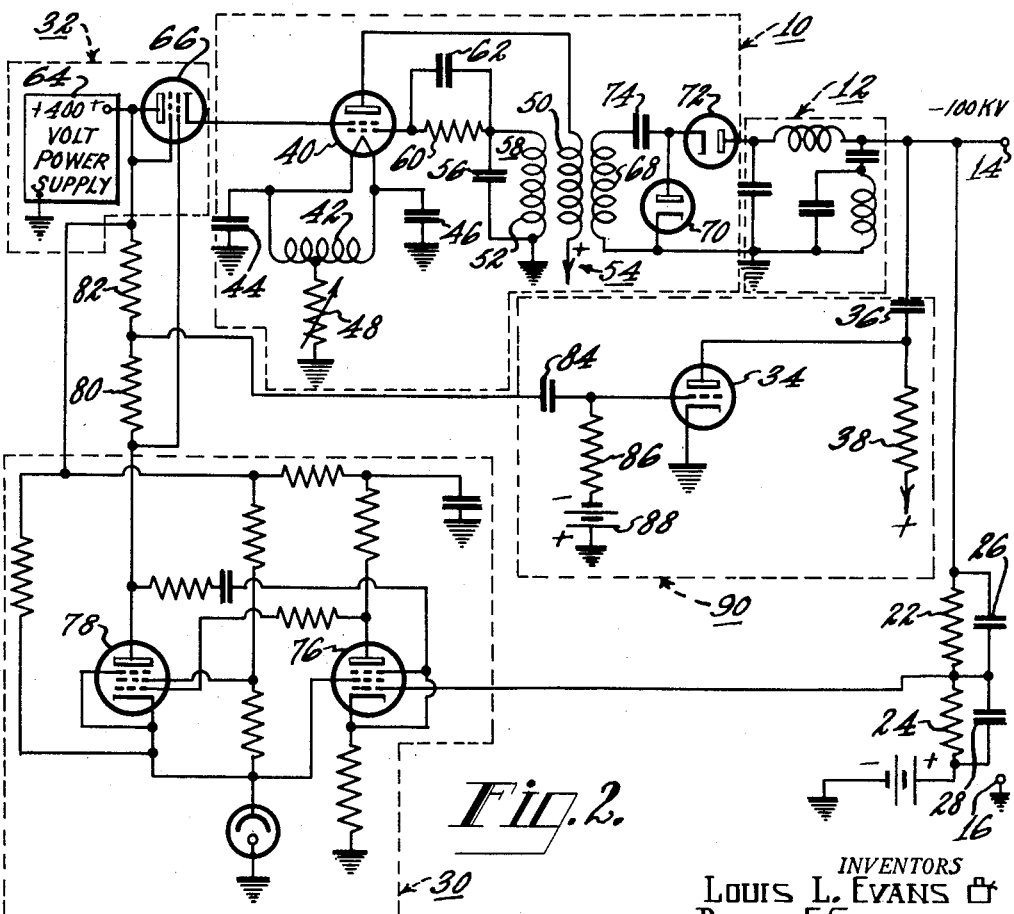

The novel features of the present invention, as well as the invention itself, both as to its organization and method of operation, will be understood in detail from the following description when considered in connection with the accompanying drawing, in which similar reference characters represent similar parts, and in which:

Fig. 1 is a schematic diagram, partly in block diagram form, of a regulated power supply in accordance with the present invention; and Fig. 2 is a detailed embodiment of an R.F. power supply illustrated in Fig. 1.

Referring now particularly to Fig. 1, there is shown, partly in block diagram form, a power supply of the type adapted to provide a unidirectional negative output voltage of about 100 kilovolts. Oscillator and high voltage rectifier circuits 10 provide a unidirectional output voltage applied to a low pass filter 12 where the oscillator ripple is filtered. The output of the filter 12 is connected to a negative output terminal 14. A positive output terminal 16 is connected to a point of reference potential, such as ground. The negative output terminal 14 is connected to ground through a frequency compensated voltage divider 18 and any suitable source of D.-C. reference voltage 20, represented herein as a battery. The negative terminal of the voltage source 20 is connected to ground. The voltage divider 18 comprises serially connected resistors 22 and 24, each connected in parallel with serially connected capacitors 26 and 28, respectively. The common junction between the capacitors 26 and 28, and between the resistors 22 and 24, comprise means for obtaining a sample of the output voltage existing between the output terminals 14 and 16 of the power supply. A sample of the output voltage, thus derived, is fed back to the oscillator and high voltage rectifier circuits 10 through a D.-C. amplifier 30 and a series regulator tube circuits 32 for the purpose of regulating the unidirectional output voltage due to variations in the line voltage and/or variations in the load (not shown).

Any low frequency ripples in the output voltage between the output terminals 14 and 16, especially ripples occurring at a frequency of 120 cycles per second, are filtered by an amplifier circuit comprising an electron discharge device, such as a triode tube 34. The cathode of the triode tube 34 is connected to ground, and the anode thereof is connected to the negative output terminal 14 through a D.-C. blocking capacitor 36. The anode of the tube 34 is also connected to a source of suitable operating potential (not shown) through a load resistor 38.

A portion of the fedback output voltage is applied from the output of the D.-C. amplifier 30 to the grid of the tube 34. With this arrangement any ripple voltage appearing at the negative output terminal 14, with respect to ground, is amplified by the tube 34 and capacitively coupled in phase opposition to the alternating current (A.-C.) ripple voltage appearing at the output terminal 14. Thus, the tube 34 and its associated circuitry provides means for reducing the A.-C. ripple voltage in the output voltage of the power supply without the necessity of increasing the gain of the D.-C. amplifier 30.

Referring now to Fig. 2, there is shown an embodiment of the R.F. power supply illustrated in Fig. 1, suitable for providing the unidirectional high voltage for an electron microscope. The oscillator circuit of the oscillator and high voltage rectifier circuits 10 comprises an electron discharge device, such as a tetrode tube 40 used as an oscillator. The filament of the tetrode 40 is connected across a center-tapped secondary winding 42 of a transformer (not shown) for heating the filament, in a manner well known in the art. Each end of the secondary winding 42 is bypassed to ground by capacitors 44 and 46. The center tap of the secondary winding 42 is connected to ground through a variable resistance 48 for the purpose of providing suitable cathode bias for the tetrode 40. The tetrode 40 is connected in an oscillator circuit whereby the feedback from the anode to the grid is accomplished by means of a feedback winding 50, inductively coupled to the grid coil winding 52 of a transformer 54. A capacitor 56 connected across the grid coil winding 52 forms a tuned circuit 58 therewith that determines the frequency of oscillation of the oscillator circuit. The anode of the tube 40 is connected to a source of suitable operating voltage (not shown) through the feedback winding 50. The control grid of the tetrode 40 is connected to the tuned circuit 58 through a grid leak resistor 60 shunted by a capacitor 62. The screen grid of the tetrode 40 derives its D.-C. operating potential from a power supply 64 through a series regulator tube 66. The cathode of the series regulator tube 66 is connected to the screen grid of the oscillator tube 40, and the anode of the series regulator tube 66 is connected to the positive terminal of the power supply 64. The negative terminal of the power supply 64 is grounded. It will now be understood that the series regulator tube 66 may function as a variable impedance, determined by the voltage applied to its control grid, to vary the voltage at the screen grid of the oscillator tube 40. It will also be understood that when suitable voltages are applied to the electrodes of the oscillator tube 40, it may be made to oscillate to provide an output voltage at a frequency in the neighborhood of 17 kilocycles per second.

The voltage oscillations appearing across the feedback winding 50 are transformed by a secondary winding 68 of the transformer 54. The secondary winding 68 is inductively coupled to the feedback winding 50 and functions to step-up the voltage in the feedback winding 50. The secondary winding 68 is connected in a voltage doubler circuit comprising diodes 70 and 72. The cathode of the diode 70 is connected to one end of the secondary winding 68, and the anode thereof is connected to the other end of the secondary winding 68 through a capacitor 74. The anode of the diode 70 is also connected to the cathode of the diode 72. The anode of the diode 72 is connected to the negative output terminal 14 of the power supply through the low pass filter 12. The low pass filter 12 is of conventional design and functions to reduce a residual ripple voltage from the oscillator circuit. The operation of the voltage doubler rectifier comprising the diodes 70 and 72, and its associated circuitry, is well known in the art, and is explained in detail in the book "Radio Electronic Fundamentals," Bureau of Ships, Navy Department, June 1944 edition, page 85.

The D.-C. amplifier 30, shown in detail in Fig. 2, is a two-stage amplifier, of conventional design, comprising a pentode 76 coupled directly to a pentode 78. The anode of the pentode 78 is connected to the positive terminal of the voltage source 64 through serially connected load resistors 80 and 82, for the purpose hereinafter appearing. The control grid of the pentode 76 is connected to the common junction of the resistors 22 and 24, and of the capacitors 26 and 28, of the voltage divider 18. It will now be understood that the D.-C. amplifier 30 comprises means to amplify a sample of the output voltage between the output terminals 14 and 16. The phase of a sample voltage applied to the control grid of the pentode 76 is the same as the phase of the output voltage at the anode of the pentode 78; that is, a negative-going signal applied to the control grid of the pentode 76 will result in an amplified negative-going signal at the anode of the pentode 78.

The anode of the pentode 78 is connected to the control grid of the series regulator tube 66 to control its impedance, in a manner to be explained hereinafter. A portion of the amplified fedback signal at the anode of the pentode 78 is applied to the control grid of the triode tube 34 by connecting the control grid of the tube 34 to the common junction of the load resistors 80 and 82, through a capacitor 84. Suitable operating bias is applied to the control grid of the triode 34 by a resistor 86 connected to ground, through a source of D.-C. bias voltage 88. The positive terminal of the voltage source 88 is connected to ground.

The operation of the regulated power supply illustrated in Fig. 2 will now be described. Voltage oscillations in the oscillator circuit comprising the tetrode tube 40 are coupled to the secondary winding 68 from the feedback winding 50 of the transformer 54. These voltage oscillations, which may be of a frequency of 17 kilovolts, are stepped up by the secondary winding 68 and rectified in the voltage doubler rectifier comprising the diodes 70 and 72, in a manner well known in the art. The output from the voltage doubler rectifier is filtered by the low pass filter 12 and applied between the output terminals 14 and 16. The negative output terminal 14, may now be minus 100 kilovolts with respect to the grounded positive output terminal 16. Let it now be assumed that there is a tendency for the unidirectional output voltage between the terminals 14 and 16 to increase, as when a load (not shown) connected between the output terminals 14 and 16 is decreased. A sample of the increased output voltage will be sensed by the control grid of the pentode 76 of the D.-C. amplifier 30. An amplified negative-going voltage is obtained from the anode 78 of the D.-C. amplifier 30 and applied to the control grid of the series regulator tube 66. This results in increasing the impedance of the series regulator tube 66, and the voltage at the screen grid of the tetrode 40 in an oscillator circuit is consequently decreased. The amplitude of the oscillations of the oscillator circuit is, therefore, proportionally decreased. Consequently, the unidirectional output voltage between the output terminals 14 and 16 will also decrease to offset the original tendency for the output voltage to increase. A tendency for the unidirectional output voltage to decrease will result in a reverse set of conditions that will tend to increase the voltage on the screen grid of the tetrode oscillator of the oscillator tube 40. This will result in oscillations of increased amplitude and, hence, the resulting rectified voltages will tend to offset the original tendency of the output voltage to decrease.

The aforementioned regulation of the output voltage is satisfactory for cancelling the relatively high ripple frequencies of the oscillator circuit. Relatively low ripple frequencies, however, derived from voltage sources such as the voltage source 64 in the neighborhood of 60 and 120 cycles per second (c.p.s.) may be filtered further by the amplifier circuit, associated with the triode tube 34, included within the dashed rectangle 90 in Fig. 2. The operation of the low frequency filter amplifier circuit 90, will now be described. Let it be assumed, again, that there is a tendency for the low frequency ripple voltage component of the output voltage across the output terminals 14 and 16 to increase instantaneously, that is, the voltage at the output terminal 14 tends to go negative with respect to ground. This negative-going voltage is sensed by the input to the D.-C. amplifier 30, and a negative-going amplified voltage is derived at the output of the D.-C. amplifier 30. A portion of this negative-going amplified voltage is applied to the control grid of the triode 34. As a consequence of the load resistor 38 connected to the anode of the tube 34, a positive-going voltage is obtained at the anode of the tube 34. This positive-going voltage is now fed back to the negative output terminal 14 in phase opposition to the original tendency of the voltage at the output terminal 14 to go more negative. It will now be understood that a tendency for the negative output terminal to go more positive will be offset by a reverse set of conditions resulting in a negative-going voltage from the anode of the tube 34 applied to the output terminal 14 to oppose the original tendency for the voltage to change.

Thus, there has been shown and described, in accordance with the objects of the present invention, an improved regulated R.F. power supply wherein line voltage variations and load variations are regulated via a feedback loop to control the voltage on the screen grid of the R.F. oscillator circuit. The relatively low frequency ripple voltages are cancelled by a sample of the output voltage fed back to the control grid of a tube whose cathode is coupled to one output terminal and whose anode is connected to the other output terminal through a capacitor.

What is claimed is:

1. In a power supply of the type wherein voltage oscillations are rectified and applied between a pair of output terminals as a unidirectional output voltage; the combination therewith of an amplifier circuit comprising an electron discharge device having a control element and at least an anode and a cathode, a capacitor, means to connect only said capacitor between said anode and one of said output terminals, means to connect said cathode to the other of said output terminals, and means to feedback a sample of said output voltage between said output terminals to said control element.

2. In a power supply of the type wherein voltage oscillations are rectified and applied between a pair of output terminals as a unidirectional output voltage; the combination therewith of an electron discharge device having a control element and at least an anode and a cathode, a capacitor, means to connect only said capacitor between said anode and one of said output terminals, means to connect said cathode to the other of said output terminals, means to feedback a sample of said output voltage between said output terminals to said control element, a resistor, and means including said resistor to apply a source of operating voltage between said anode and said cathode.

3. In a power supply of the type wherein a source of voltage oscillations are rectified and applied as a unidirectional output voltage between a pair of output terminals, said source of voltage oscillations comprising an electron discharge device having a plurality of grids; the combination therewith of means connected between said output terminals to obtain a sample of said output voltage therebetween, a series regulator tube having at least an anode, a control electrode and a cathode, means connecting said cathode to one of said plurality of grids of said electron discharge device, means for applying an operating voltage to said anode, feedback means for applying said sample voltage to said control electrode, a second electron discharge device having at least an anode, a cathode, and a control element, a resistor having one end connected to said anode of said second device, means for applying a source of operating voltage between the other end of said resistor and said cathode of said second device, means for connecting said anode of said second device capacitively to one of said pair of output terminals, said cathode of said second device being connected to the other of said pair of output terminals and means including said feedback means to apply said sample voltage to said control element.

4. A power supply comprising an oscillator circuit for producing voltage oscillations, a pair of output terminals for said power supply, means to rectify said voltage oscillations and to apply a unidirectional output voltage between said output terminals, means connected between said output terminals to obtain a sample of said output voltage, feedback means to apply said sample voltage to said oscillator circuit to control the amplitude of said voltage oscillations in accordance with the amplitude of said sample voltage, an amplifier circuit comprising an electron discharge device having a cathode, an anode, and a control element, a capacitor, means for connecting only said capacitor between said anode and one of said output terminals, means for connecting said cathode to the other of said output terminals, and means including said feedback means for applying said sample of said output voltage to said control element.

5. A radio-frequency power supply comprising an oscillator circuit for producing voltage oscillations, positive and negative output terminals of said power supply, means to rectify said voltage oscillations and to apply a unidirectional output voltage between said output terminals, means connected between said output terminals to obtain a sample of said output voltage therebetween, feedback means to apply said sample voltage to said oscillator circuit to control the amplitude of said voltage oscillations in accordance with the amplitude of said sample voltage, an electron discharge device having a cathode, an anode, and a control element, a capacitor, means for connecting only said capacitor between said anode and said negative output terminal, means for connecting said cathode to said positive output terminal, means including said feedback means for applying said sample of said output voltage to said control element, a resistor having one end connected to said anode, and means for applying a source of operating voltage between the other end of said resistor and said cathode.

6. A power supply comprising a source of voltage oscillations, said source comprising a first electron discharge device having a plurality of electrodes, a pair of output terminals for said power supply, means for deriving from said voltage oscillations a unidirectional high output voltage, means for applying said output voltage between said output terminals, means connected between said output terminals for obtaining a sample of said output voltage, a second electron discharge device connected in series with one of said plurality of electrodes of said first electron discharge device, means to apply a source of voltage in series with said second electron discharge device and said one electrode of said first electron discharge device, said second electron discharge device having a control electrode, feedback means to apply said sample of said output voltage to said control electrode, an amplifier circuit comprising a third electron discharge device, a capacitor, means to connect said capacitor and said third electron discharge device in series with each other and between said output terminals, said third electron discharge device having a control element, and means including said feedback means to apply said sample of said output voltage to said control element.

7. A power supply comprising a source of voltage oscillations, said source comprising a first electron discharge device having a plurality of electrodes, a pair of output terminals for said power supply, means for deriving from said voltage oscillations a unidirectional high output voltage, means for applying said output voltage between said output terminals, means connected between said output terminals for deriving a sample of said output voltage, a second electron discharge device connected in series with one of said plurality of electrodes of said first electron discharge device, means to apply a source of voltage in series with said second electron discharge device and said one electrode of said first electron discharge device, said second electron discharge device having a control electrode, feedback means to apply said sample of said output voltage to said control electrode, a third electron discharge device having an anode, a cathode and a control element, a capacitor, means to connect said capacitor between said anode and one of said output terminals, means to connect said cathode to the other of said output terminals, means including said feedback means to apply said sample of said output voltage to said control element, a resistor, and means including said resistor to apply a source of operating voltage between said anode and said cathode.

References Cited in the file of this patent

UNITED STATES PATENTS

| | | |
|---|---|---|
| 2,215,175 | Fewings | Sept. 17, 1940 |
| 2,386,548 | Fogel | Oct. 9, 1945 |
| 2,565,621 | Olson | Aug. 28, 1951 |
| 2,683,852 | Sampson | July 13, 1954 |
| 2,697,798 | Schlesinger | Dec. 21, 1954 |
| 2,720,622 | Deuser | Oct. 11, 1955 |
| 2,739,191 | Wisenbaker et al. | Mar. 20, 1956 |
| 2,753,509 | Merriam | July 3, 1956 |